(12) United States Patent
Wang et al.

(10) Patent No.: US 9,236,600 B2
(45) Date of Patent: Jan. 12, 2016

(54) METHOD FOR MAKING LITHIUM ION BATTERY ANODE

(75) Inventors: Jia-Ping Wang, Beijing (CN); Shu Luo, Beijing (CN); Kai-Li Jiang, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 383 days.

(21) Appl. No.: 13/340,235

(22) Filed: Dec. 29, 2011

(65) Prior Publication Data
US 2013/0106025 A1 May 2, 2013

(30) Foreign Application Priority Data

Oct. 28, 2011 (CN) .......................... 2011 1 0333505

(51) Int. Cl.
| | |
|---|---|
| H01M 4/13 | (2010.01) |
| H01M 4/139 | (2010.01) |
| H01M 4/62 | (2006.01) |
| H01M 4/131 | (2010.01) |
| H01M 4/134 | (2010.01) |
| H01M 10/0525 | (2010.01) |

(52) U.S. Cl.
CPC ................ *H01M 4/13* (2013.01); *H01M 4/139* (2013.01); *H01M 4/625* (2013.01); *H01M 4/131* (2013.01); *H01M 4/134* (2013.01); *H01M 10/0525* (2013.01); *Y02E 60/122* (2013.01)

(58) Field of Classification Search
USPC .................................................. 264/442, 122
See application file for complete search history.

(56) References Cited

U.S. PATENT DOCUMENTS

| | | | | |
|---|---|---|---|---|
| 6,314,638 | B1 * | 11/2001 | Kaido et al. .................... | 29/730 |
| 6,555,411 | B1 * | 4/2003 | Bao et al. ........................ | 438/99 |
| 2008/0241695 | A1 * | 10/2008 | Song et al. ................. | 429/231.8 |
| 2009/0098453 | A1 | 4/2009 | Liu et al. | |
| 2009/0153516 | A1 * | 6/2009 | Liu et al. ....................... | 345/173 |
| 2009/0298239 | A1 * | 12/2009 | Liu et al. ....................... | 438/151 |
| 2009/0317710 | A1 * | 12/2009 | Douglas et al. ............... | 429/163 |

(Continued)

FOREIGN PATENT DOCUMENTS

| | | |
|---|---|---|
| CN | 101439972 | 5/2009 |
| CN | 101859892 | 10/2010 |
| TW | 200919811 | 5/2009 |
| TW | 201010940 | 3/2010 |

OTHER PUBLICATIONS

Li, Kang, Bai, and Shen, A novel network composite cathode of LiFePO4/multiwalled carbon nanotubes with high rate capability for lithium batteries, Electrochemistry Communications, vol. 9 (2007) pp. 663-666.*

(Continued)

*Primary Examiner* — Matthew Daniels
(74) *Attorney, Agent, or Firm* — Novak Druce Connolly Bove + Quigg LLP (57) ABSTRACT

A method for making a lithium ion battery anode is provided. A carbon nanotube source including a plurality of carbon nanotubes is made. An anode material including a number of anode material particles and a solvent is provided. The carbon nanotube source and the anode material are added into the solvent, and the solvent with the carbon nanotube source and the anode material is shaken using ultrasonic waves. The carbon nanotube source and the anode material are then separated from the solvent to obtain the lithium ion battery anode.

20 Claims, 7 Drawing Sheets

(56) References Cited

U.S. PATENT DOCUMENTS

2010/0051471 A1    3/2010   Meng et al.
2010/0203370 A1*  8/2010   Pozin et al. .................... 429/94
2011/0256451 A1  10/2011  Cui et al.
2011/0262805 A1  10/2011  Wang et al.

OTHER PUBLICATIONS

Xing, Li, Chusuei, and Hull, Sonochemical Oxidation of Multiwalled Carbon Nanotubes, Langmuir, vol. 21 (2005) pp. 4185-4190.*

Gao, Jiang, and Wan, Influence of carbon additive on the properties of spherical $Li_4Ti_5O_{12}$ and $LiFePO_4$ materials for lithium-ion batteries.*

Ng. S.H., et al., Single wall carbon nanotube paper as anode for lithium-ion battery, Electrochimica Acta, vol. 51 (2005) pp. 23-28.*

Hsiao, K.-C., et al., Microstructure effect on the electrochemical property of $Li_4Ti_5O_{12}$ as an anode material for lithium-ion batteries, Electrochimica Acta, vol. 52 (2008), pp. 7242-7247.*

Chou, S.L., J.Z.Wang, M. Choucair, H.K. Liu, J.A. Stride, S.X. Dou, Enhanced reversible lithium storage in a nanosize silicon/graphe composite, Electrochemistry Communications, vol. 12 (2010), pp. 303-306.*

Huang, J. and Z. Jiang, The preparation and characterizatino of $Li_4Ti_5O_{12}$/carbon nano-tubes for lithium ion battery, Electrochemica Acta, vol. 53 (2008), pp. 7756-7759.*

Chew, S.Y., et al., Flexible free-standing carbon nanotube films for model lithium-ion batteries, Carbon, vol. 47 (2009), pp. 2976-2983.*

* cited by examiner

METHOD FOR MAKING LITHIUM ION BATTERY ANODE

CROSS-REFERENCE TO RELATED APPLICATIONS

This application claims all benefits accruing under 35 U.S.C. §119 from China Patent Application No. 201110333505.6, filed on Oct. 28, 2011, in the China Intellectual Property Office, the contents of which are hereby incorporated by reference. The application is also related to copending applications entitled, "METHOD FOR MAKING LITHIUM ION BATTERY CATHODE", filed Dec. 29, 2011 (Ser. No. 13/340,585); "LITHIUM ION BATTERY ANODE", filed Dec. 29, 2011 (Ser. No. 13/340,260).

BACKGROUND

1. Technical Field

The present disclosure relates to a method for making lithium ion battery anodes, particularly, to a method for making a carbon nanotube based lithium ion battery anode.

2. Description of Related Art

A typical lithium ion battery mainly includes a cathode, an anode, a separator, and an electrolyte. The anode usually includes anode material, conductive particles, and adhesive. The adhesive is used to bond the anode material and conductive particles together, so that the anode can have a stable structure with a desired shape. The adhesive is usually composed of insulative organic material. The organic material includes polyvinylidene fluoride (PVDF), polyfluortetraethylene (PTFE), or styrene-butadiene rubber (SBR). A mass ratio of the adhesive to the anode is usually about 10%. Thus, the adhesive would decrease the conductivity and specific capacity of the anode.

What is needed, therefore, is to provide a method for making a lithium ion battery anode without adhesive.

BRIEF DESCRIPTION OF THE DRAWING

Many aspects of the present disclosure can be better understood with reference to the following drawings. The components in the drawings are not necessarily to scale, the emphasis instead being placed upon clearly illustrating the principles of the present embodiments.

DETAILED DESCRIPTION

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean at least one.

Figure 1:
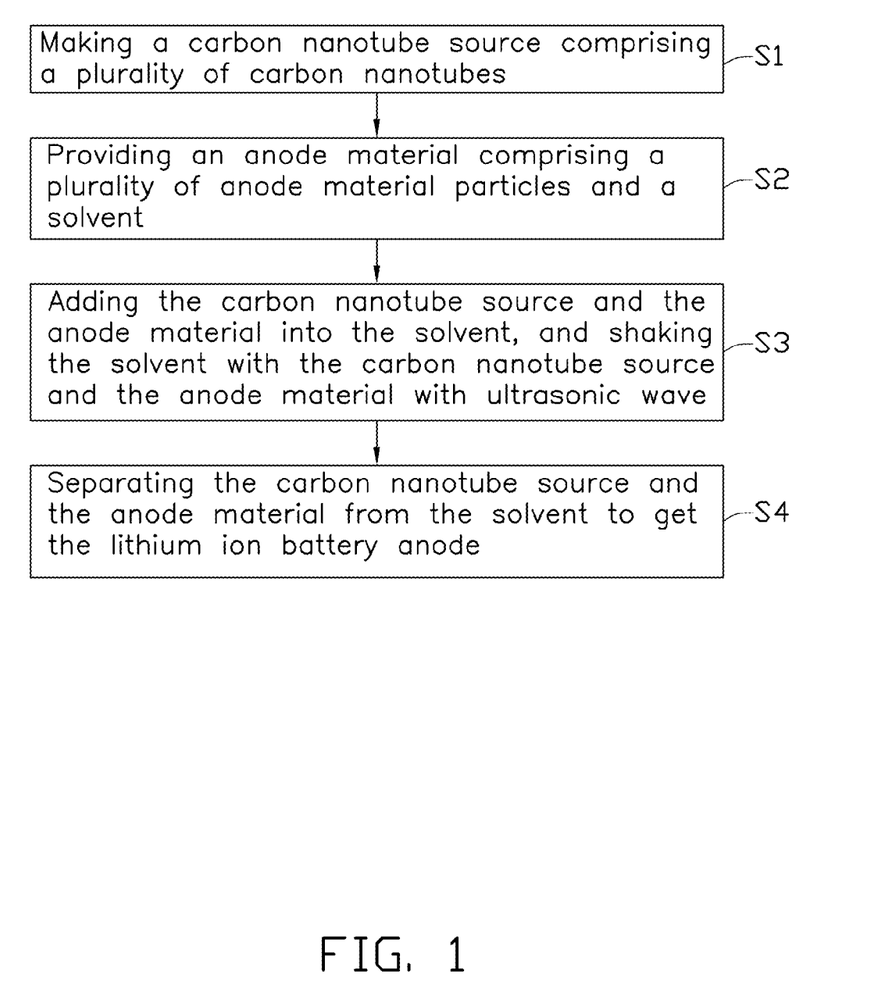
FIG. 1 is a flow chart of one embodiment of a process for making a lithium ion battery anode.

Referring to FIG. 1, a method for making a lithium ion battery anode according to one embodiment is provided. The method includes the following steps:

S1: making a carbon nanotube source including a number of carbon nanotubes;

S2: providing an anode material including a number of anode material particles and a solvent;

S3: adding the carbon nanotube source and the anode material into the solvent, and shaking the solvent with the carbon nanotube source and the anode material with ultrasonic waves; and S4: separating the carbon nanotube source and the anode material from the solvent to obtain a lithium ion battery anode.

In step S1, the carbon nanotube source can be made of carbon nanotubes. The carbon nanotubes can be single-walled carbon nanotubes, double-walled carbon nanotubes, or multi-walled carbon nanotubes. A diameter of the carbon nanotube can be in a range from about 1 nanometer to about 200 nanometers. The carbon nanotubes can be pure, meaning there is few or no impurities adhered on surface of the carbon nanotubes. In some embodiments, there are no functional groups attached on the carbon nanotubes. A length of the carbon nanotubes can be the same or different. The length of the carbon nanotubes can be longer than 300 micrometers. In one embodiment, the length of the carbon nanotubes is substantially the same. A method for making the carbon nanotube source can include providing a carbon nanotube array, wherein the carbon nanotube array can be formed on a substrate, and scratching the carbon nanotube array from the substrate to form the carbon nanotube source. The carbon nanotube source obtained directly from the carbon nanotube array can make the lithium ion battery anode stronger. In one embodiment, the carbon nanotube array is a super aligned carbon nanotube array. In the super aligned carbon nanotube array, a length of the carbon nanotubes is almost the same or longer than 300 micrometers. Surfaces of the carbon nanotubes are clean and without impurities. The lithium ion battery anode made by the above method only includes the carbon nanotube source and the anode material.

In step S1, the carbon nanotube array can be made using a CVD method, arc discharge method, aerosol method, or any other appropriate method. In one embodiment, a method for making the carbon nanotube array includes:

S11: providing a substantially flat and smooth substrate;

S12: applying a catalyst layer on the substrate;

S13: annealing the substrate with the catalyst layer at a temperature in the range of about 700° C. to about 900° C. in air for about 30 minutes to about 90 minutes;

S14: heating the substrate with the catalyst layer at a temperature in the range from about 500° C. to about 740° C. in a furnace with a protective gas therein; and S15: supplying a carbon source gas to the furnace for about 5 to about 30 minutes and growing a super-aligned array of the carbon nanotubes from the substrate.

In step S11, the substrate can be a P or N-type silicon wafer. In one embodiment, a 4-inch P-type silicon wafer is used as the substrate.

In step S12, the catalyst can be made of iron (Fe), cobalt (Co), nickel (Ni), or any combination alloy thereof.

In step S14, the protective gas can be made up of at least one of nitrogen ($N_2$), ammonia ($NH_3$), and a noble gas.

In step S15, the carbon source gas can be a hydrocarbon gas, such as ethylene ($C_2H_4$), methane ($CH_4$), acetylene ($C_2H_2$), ethane ($C_2H_6$), or any combination thereof.

Figure 2:
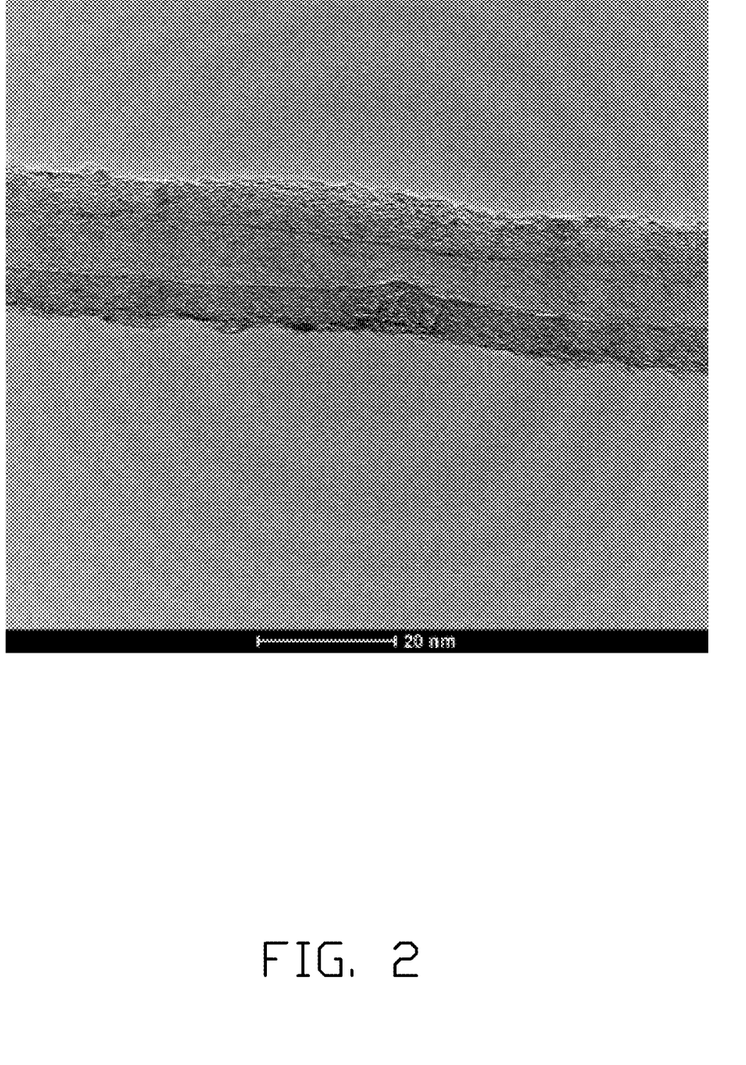
FIG. 2 is a Transmission Electron Microscope (TEM) image of a carbon nanotube of a carbon nanotube source.

The carbon nanotube array formed by the above method is a super aligned carbon nanotube array. Referring to FIG. 2, a carbon nanotube of the carbon nanotube array is almost pure, and a surface of the carbon nanotube is clean.

In step S2, the anode material can be doped or undoped lithium titanate, silicon oxide, silicon nanoparticles, or any combination thereof. A shape of the anode material particles is not limited, and can be irregular or regular. A diameter of the anode material particles can be in a range from about 10 nanometers (nm) to about 100 micrometers (μm). In one embodiment, the anode material particles are lithium titanate particles.

In step S2, the solvent can be ethanol, glycol, acetone, N-Methyl-2-pyrrolidone, water, or a combination thereof. In one embodiment, the solvent is ethanol. The solvent is contained in a container, such as a beaker.

In step S3, the order of adding the carbon nanotube source and the anode material is not limited. In one embodiment, the carbon nanotube source can be added into the solvent first, and then the anode material is added. In another embodiment, the anode material is added into the solvent first, and then the carbon nanotube source is added. In still another embodiment, the anode material and the carbon nanotube source are added into the solvent at the same time.

In step S3, the carbon nanotube source and the anode material form a mixture. A weight percentage of the carbon nanotubes in the mixture can be in a range from about 0.1% to about 20%. In some embodiments, the weight percentage of the carbon nanotubes can be in a range from about 1% to about 10%, such as 3%, 5% or 8%. In one embodiment, a weight ratio between the carbon nanotube source and the anode material is about 0.2:8, and the weight percentage of the carbon nanotubes is about 2.4%.

In step S3, a power of the ultrasonic wave can be in a range from about 400 W to about 1500 W. In some embodiments, the power is in a range from about 800 W to about 1000 W. A time of shaking with the ultrasonic wave can range from about 2 minutes to about 300 minutes. In some embodiments, the shaking time ranges from about 5 minutes to about 10 minutes. The solvent with the carbon nanotube source and the anode material can be shaken with ultrasonic waves continuously or at intervals. The interval ultrasonic wave is alternatively in working status for a time T1, and in rest status for a time T2. The time T1 and the time T2 can be the same or different. A sum of the time T1 can be in a range from about 2 minutes to about 300 minutes.

Figure 3:
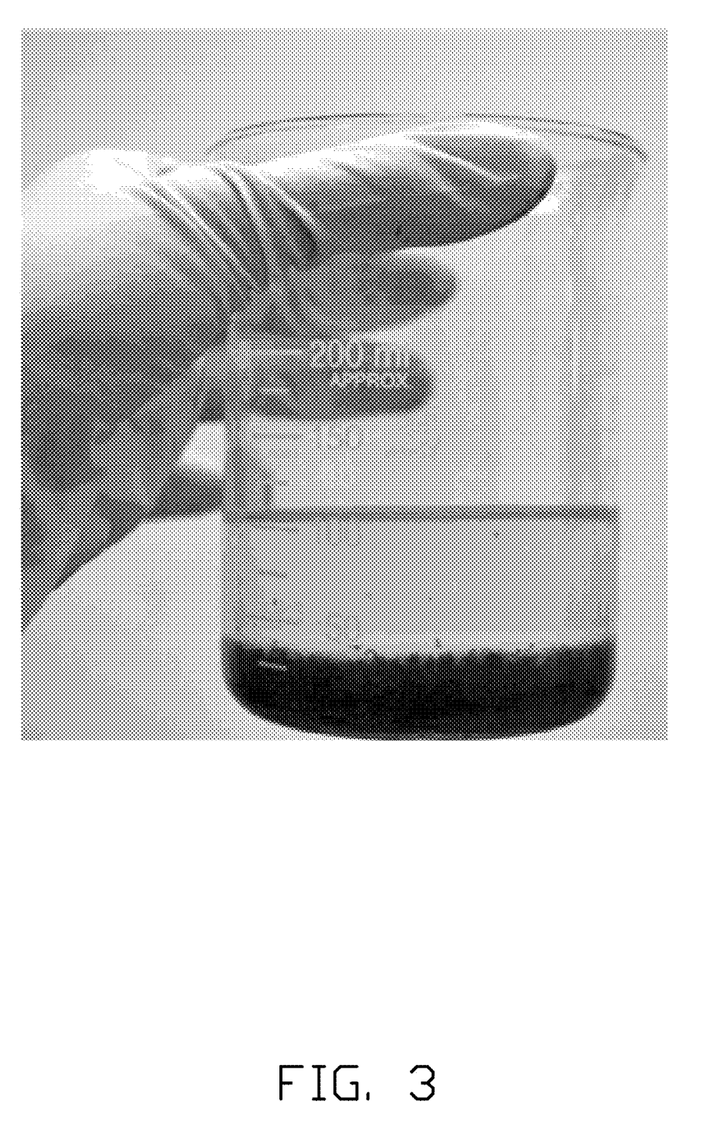
FIG. 3 is a photo showing a mixture including the carbon nanotube source and anode material particles deposited on a bottom of a solvent in the process for making the lithium ion battery anode.
Figure 4:
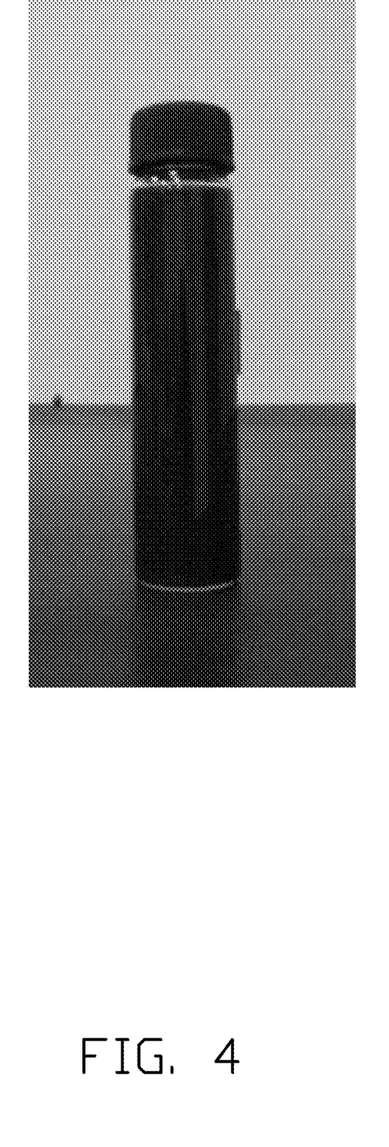
FIG. 4 is a photo showing a mixture including carbon blacks and anode material particles suspended in a solvent in a contrast experiment.

In step S4, after the solvent with the carbon nanotube source and the anode material is shaken, the carbon nanotubes in the carbon nanotube source and the anode material particles in the anode material combine with each other to form a mixture. The mixture consists of the carbon nanotubes and anode material particles. The solvent with the mixture is kept still for about 1 minute to about 20 minutes. The mixture will deposit to a bottom of the solvent. Referring to FIG. 3, in one embodiment, after the solvent with the mixture has been kept still for about 10 minutes, the mixture will have deposited to the bottom of the solvent. Carbon nanotubes or anode material particles will be suspended in the solvent. After the solvent with the carbon nanotube source and the anode material is shaken, the carbon nanotubes are entangled with each other to form a net structure. The anode material particles are wrapped by the net structure and attached on the surface of the carbon nanotubes to form an integrity mixture. The anode material particles have a larger density than the solvent, and as such, the integrity mixture can be deposited to the bottom of the solvent. After the mixture has deposited to the bottom of the solvent, the solvent can be absorbed out from the container by a pipe, thereby separating the mixture from the solvent. Referring to FIG. 4, in a different experiment, a number of carbon blacks and the anode material particles are added into the solvent, and the solvent is shaken with ultrasonic waves for the same period of time. The solvent is kept with the mixture of the carbon blacks and the anode material particles for about 5 hours. The mixture was found to still be suspended in the solvent. That is, the carbon blacks and the anode material particles could not form an integrity mixture. Although the carbon blacks and the anode material particles were separated from the solvent, they could not from an integrity structure with enough strength, and therefore cannot be used as a lithium ion battery anode.

In step S4, after the carbon nanotube source and the anode material are separated from the solvent, the mixture of the carbon nanotube source and the anode material can be dried at a room temperature or at a temperature from about 25 centigrade to about 80 centigrade. In one embodiment, the mixture is dried at about 70 centigrade. After the mixture is dried, the mixture can be cut directly to form the lithium ion battery anode. In other embodiments, the mixture can be pressed and then cut to form the lithium ion battery anode. A thickness of the lithium ion battery anode can be larger than 10 micrometers, although the lithium ion battery anode with a small thickness of about 10 micrometers, it is still sufficiently strong to satisfy its application.

Figure 5:
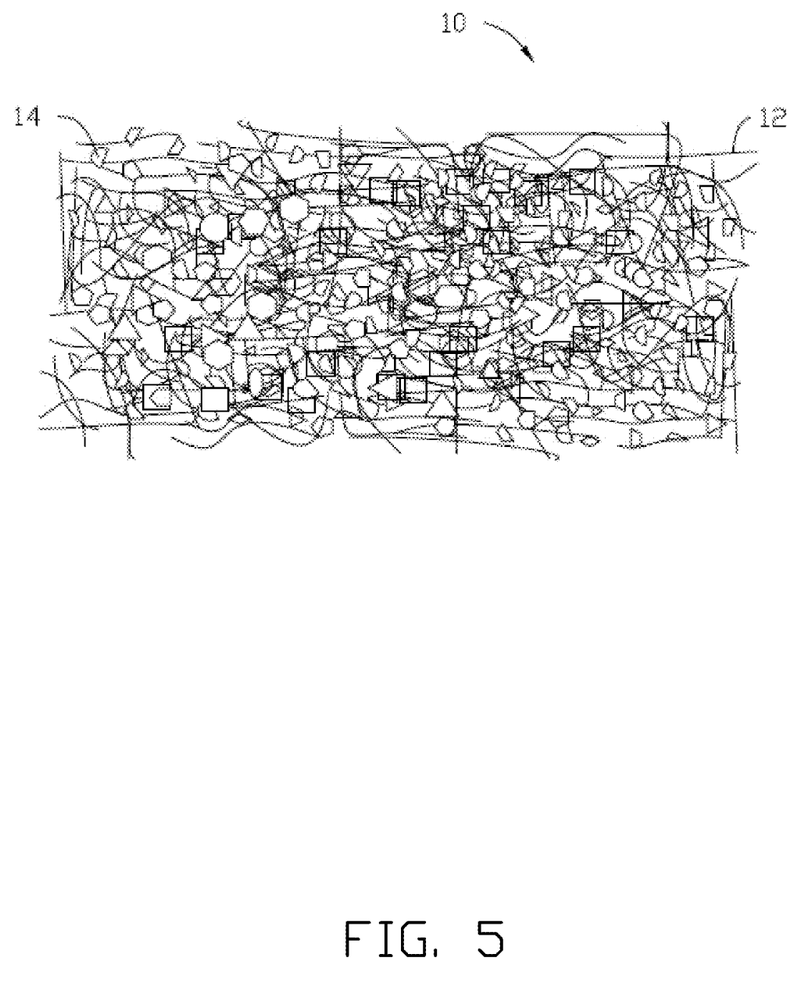
FIG. 5 is a structural schematic view of the lithium ion battery anode.

Referring to FIG. 5, one embodiment of a lithium ion battery anode 10 includes a plurality of anode material particles 14 and a plurality of carbon nanotubes 12. The plurality of carbon nanotubes 12 is entangled with each other to form a net structure. The plurality of anode material particles 14 is wrapped by the net structure and attached on the surface of the carbon nanotubes 12.

The carbon nanotubes 12 are entangled with each other and combined by van der Waals attractive force therebetween, thereby forming an integral continuous net structure having a plurality of micropores defined by the carbon nanotubes 12. The net structure can be a free-standing structure. The term "free-standing structure" means that the net structure can sustain the weight of itself when it is hoisted by a portion thereof without any significant damage to its structural integrity. So, if the net structure is placed between two separate supports, a portion of the net structure not in contact with the two separate supports would be suspended between the two separate supports and still maintain structural integrity. The free-standing structure is different from powder which would fall if the powder is not in contact with the support. In addition, the carbon nanotubes 12 are disorderly aligned. A density distribution of the carbon nanotubes 12 in the net structure is substantially the same, or mass ratios of the carbon nanotubes 12 to the lithium ion battery anode 10 per unit volume are substantially the same. Thus, a resistivity of the lithium ion battery anode 10 can be substantially uniform.

The carbon nanotubes 12 in the lithium ion battery anode 10 can serve as a conductive material and microporous carrier to support and fix the anode material particles 14. Thus, even without using an adhesive, the lithium ion battery anode 10 can be an integrative stable structure due to the net structure composed of the carbon nanotubes 12. The anode material particles 14 are uniformly distributed in the net structure. Specifically, the anode material particles 14 can be adhered on or entangled by the carbon nanotubes, or the anode material particles 14 can be wrapped by the carbon nanotubes. The anode material particles 14 and the carbon nanotubes are in contact with each other without adhesive therebetween. The anode material particles 14 and the carbon nanotubes are fixed together by van der Waals attractive force therebetween.

Figure 6:
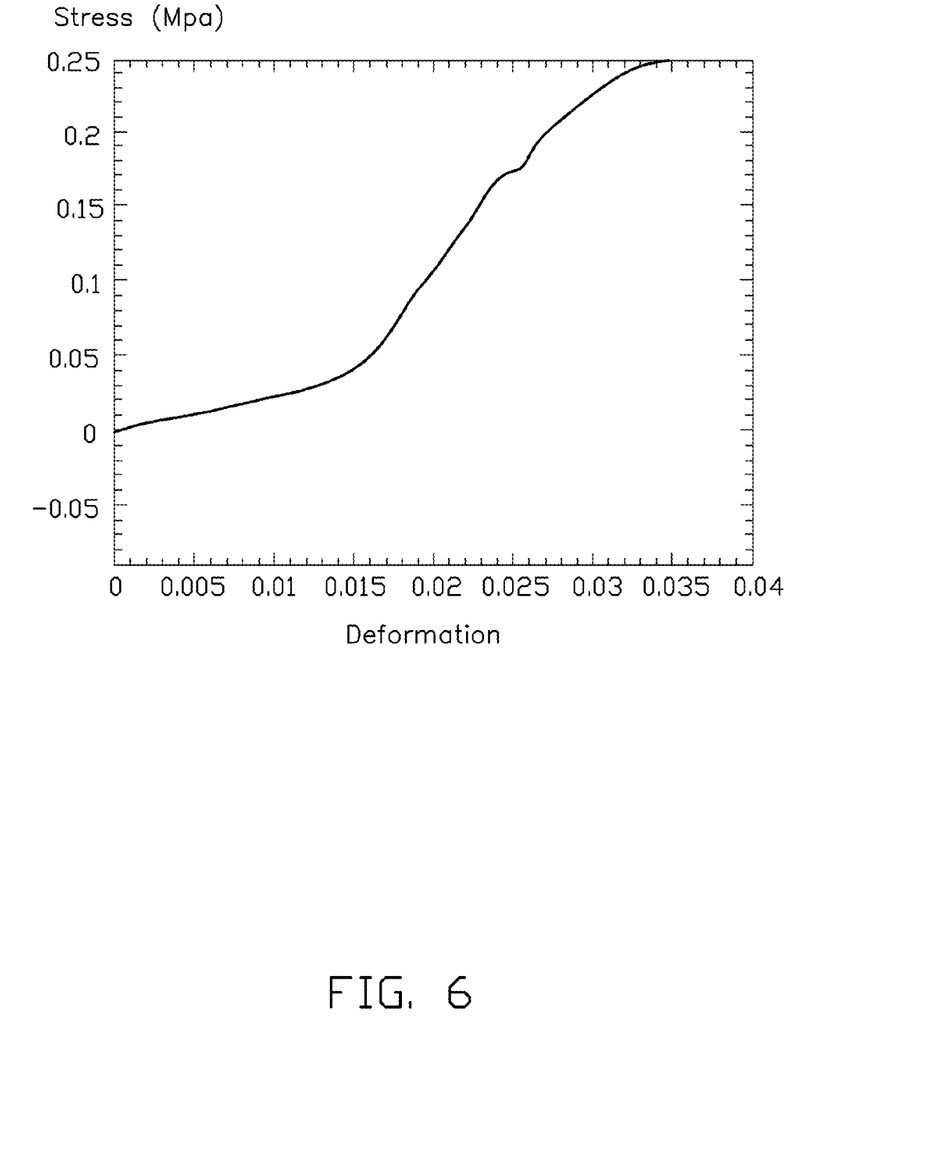
FIG. 6 is a graph showing stress-strain curves of the lithium ion battery anode of FIG. 1 and a lithium ion battery anode with adhesive.

Referring to FIG. 6, in the embodiment, the lithium ion battery anode 10 only includes the anode material particles 14 and the carbon nanotubes 12. The anode material particles 14 are lithium titanate particles. The mass ratio of the lithium titanate particles to the carbon nanotubes 12 is 8:0.2. As shown in FIG. 6, although the lithium ion battery anode 10 does not include the adhesive, the lithium ion battery anode 10 still has a sufficiently good strength for satisfying its application.

Figure 7:
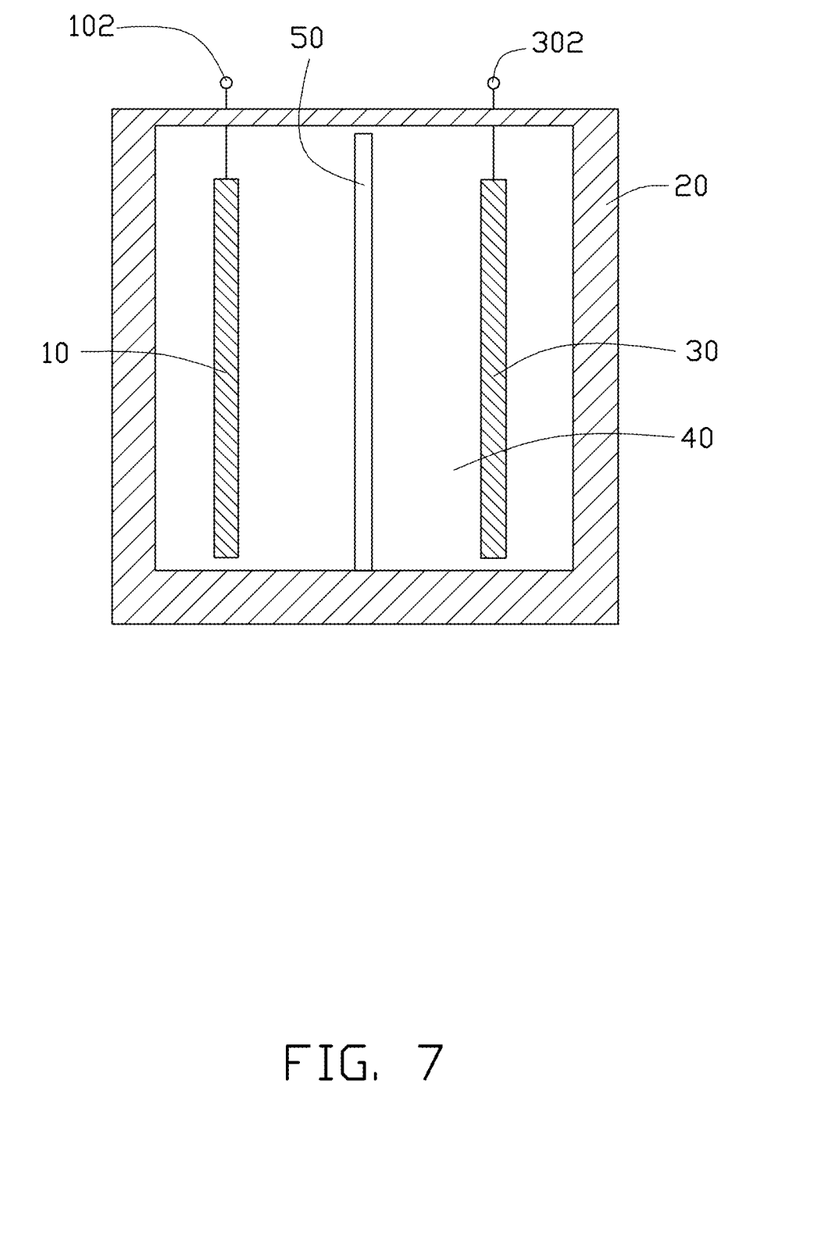
FIG. 7 is a schematic view of a lithium ion battery.

Referring to FIG. 7, one embodiment of a lithium ion battery 100 using the lithium ion battery anode 10 includes the lithium ion battery cathode 30, the lithium ion battery anode 10, the separator 50, the nonaqueous electrolyte solution 40, an external encapsulating shell 20, a cathode terminal 302, and an anode terminal 102. The lithium ion battery cathode 30, the lithium ion battery anode 10, the separator 50, and the nonaqueous electrolyte solution 40 are encapsulated in the encapsulating shell 20. The lithium ion battery cathode 30 and the lithium ion battery anode 10 are stacked with each other and sandwich the separator 50. The lithium ion battery cathode 30 and the lithium ion battery anode 10 can be in contact with or spaced from the separator 50. The cathode terminal 302 is electrically connected with the cathode 30. The anode terminal 102 is electrically connected with the lithium ion battery anode 10.

Furthermore, the lithium ion battery anode 10 can also be further disposed on an anode current collector (not shown). The lithium ion battery cathode 30 can be further disposed on a cathode current collector (not shown). The anode current collector and the cathode current collector can be a metal sheet. In addition, the carbon nanotubes 12 in the lithium ion battery anode 10 are entangled with each other to form the net structure, and the carbon nanotubes 12 are combined with each other by van der Waals attractive force. The net structure can be a free-standing structure. Thus, the cathode current collector is optional, namely, the lithium ion battery anode 10 can exist without being supported by the cathode current collector.

In use, a voltage is applied to the lithium ion battery 100 by the anode terminal 102 and the cathode terminal 302. Accordingly, the lithium ion battery 100 is charged or discharged.

Finally, it is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

What is claimed is:

1. A method for making a lithium ion battery anode comprising:
   making a carbon nanotube source comprising a plurality of carbon nanotubes without functional groups;
   providing an anode material and a solvent, wherein the anode material is doped or undoped lithium titanate, silicon oxide, silicon nanoparticles, or any combination thereof;
   adding the carbon nanotube source comprising the plurality of carbon nanotubes without functional groups and the anode material into the solvent; and shaking the solvent with the carbon nanotube source and the anode material using ultrasonic waves, wherein after the solvent with the carbon nanotube source and the anode material are shaken, the solvent with the carbon nanotube source and the anode material combine with each other to form a mixture without adhesive, the mixture comprises the carbon nanotube source and the anode material;
   allowing the solvent to deposit the mixture at a bottom of the solvent; and
   separating the mixture at the bottom from the solvent to obtain the lithium ion battery anode.

2. The method of claim 1, wherein the step of making the carbon nanotube source comprises making a carbon nanotube array on a substrate, and scratching the carbon nanotube array from the substrate.

3. The method of claim 2, wherein the step of making the carbon nanotube array comprises substeps of:
   providing a smooth substrate;
   applying a catalyst layer on the substrate;
   annealing the substrate with the catalyst layer at a temperature in the range of about 700° C. to about 900° C. in air for about 30 minutes to about 90 minutes;
   heating the substrate with the catalyst layer at a temperature in the range from about 500° C. to about 740° C.; and
   supplying a carbon source gas for about 5 to about 30 minutes and growing a super-aligned array of the carbon nanotubes from the substrate.

4. The method of claim 1, wherein the lithium ion battery anode consists of the carbon nanotube source and the anode material, and the carbon nanotube source consists of the plurality of carbon nanotubes.

5. The method of claim 1, wherein the solvent is ethanol, glycol, acetone, N-Methyl-2-pyrrolidone, water or combination thereof.

6. The method of claim 1, wherein a power of the ultrasonic waves is in a range from about 400 W to about 1500 W.

7. The method of claim 1, wherein the solvent with the mixture is kept still for about 1 minute to about 20 minutes.

8. The method of claim 7, wherein the solvent is absorbed by a pipe to separate the solvent and the mixture.

9. The method of claim 1, wherein after separating the carbon nanotube source and the anode material from the solvent, the carbon nanotube source and the anode material are dried at a temperature of about 25 centigrade to about 80 centigrade.

10. The method of claim 9, further comprising a pressing method of pressing the carbon nanotube source and the anode material after the carbon nanotube source and the anode material are dried.

11. The method of claim 1, wherein a weight percentage of the carbon nanotubes in a mixture of the plurality of carbon nanotubes and the anode material is in a range from about 0.1% to about 20%.

12. The method of claim 11, wherein the weight percentage of the carbon nanotubes in the mixture is in a range from about 1% to about 10%.

13. The method of claim 1, wherein a weight ratio between the plurality of carbon nanotubes and the anode material is about 0.2:8.

14. The method of claim 1, wherein in the lithium ion battery anode, the plurality of carbon nanotubes is entangled with each other to form a net structure, the anode material is wrapped by the net structure and attached on a surface of the plurality of carbon nanotubes in the solvent.

15. A method for making a lithium ion battery anode comprising:
  making a carbon nanotube source comprising a plurality of carbon nanotubes without functional groups;
  providing an anode material and a solvent;
  adding the anode material into the solvent first and then adding the carbon nanotube source in to the solvent; and agitating the solvent with the carbon nanotube source and the anode material using ultrasonic waves to form a mixture in the solvent, wherein a weight percentage of the plurality of carbon nanotubes in the mixture is in a range from about 0.1% to about 20%;
  allowing the solvent to deposit the mixture at a bottom of the solvent; and
  separating mixture at the bottom from the solvent to obtain the lithium ion battery anode.

16. The method of claim 15, wherein the weight percentage of the carbon nanotubes in the mixture is in a range from about 1% to about 10%.

17. The method of claim 15, wherein the solvent with the mixture after shaking is without adhesive.

18. A method for making a lithium ion battery anode comprising:
  growing a carbon nanotube array on a substrate, the carbon nanotube array comprising a plurality carbon nanotubes;
  scratching the plurality of carbon nanotubes from the substrate;
  providing an anode material and a solvent, wherein the anode material is doped or undoped lithium titanate, silicon oxide, silicon nanoparticles, or any combination thereof;
  adding the scratched plurality of carbon nanotubes and the anode material into the solvent;
  agitating the solvent with the scratched plurality of carbon nanotubes and the anode material using ultrasonic waves to entangle the scratched plurality of carbon nanotubes with each other to form a net structure, wrap the anode material by the net structure, and form a mixture in the solvent without adhesive;
  allowing the solvent to deposit the mixture to a bottom of the solvent;
  separating the mixture at the bottom from the solvent after the deposition by absorbing the solvent by a pipe to obtain the lithium ion battery anode.

19. The method of claim 18, wherein the weight percentage of the plurality carbon nanotubes in the mixture is in a range from about 1% to about 10%.

20. The method of claim 18, wherein the anode material is first added to the solvent and the scratched plurality of carbon nanotubes are then added to the solvent.

\* \* \* \* \*